United States Patent
Bleukx et al.

(10) Patent No.: US 7,906,918 B2
(45) Date of Patent: Mar. 15, 2011

(54) ADAPTIVE DRIVE FOR DIELECTRIC BARRIER DISCHARGE (DBD) LAMP

(75) Inventors: Marc Maria Alex Bleukx, Mechelen (BE); Georg Greuel, Roetgen (DE); Wolfgang Schiene, Wurselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 418 days.

(21) Appl. No.: 12/067,051

(22) PCT Filed: Sep. 11, 2006

(86) PCT No.: PCT/IB2006/053212
§ 371 (c)(1), (2), (4) Date: Mar. 17, 2008

(87) PCT Pub. No.: WO2007/031934
PCT Pub. Date: Mar. 22, 2007

(65) Prior Publication Data
US 2008/0258648 A1    Oct. 23, 2008

(30) Foreign Application Priority Data
Sep. 15, 2005    (EP) .................... 05108479

(51) Int. Cl.
*H05B 37/02*    (2006.01)
(52) U.S. Cl. .............. 315/291; 315/297; 315/307
(58) Field of Classification Search .............. 315/209 R, 315/246, 247, 276, 291, 297, 307, 308
See application file for complete search history.

(56) References Cited

U.S. PATENT DOCUMENTS

| | | | | |
|---|---|---|---|---|
| 5,654,611 A | * | 8/1997 | Yamamoto et al. | 315/308 |
| 5,910,713 A | * | 6/1999 | Nishi et al. | 315/308 |
| 6,084,361 A | * | 7/2000 | Wacyk | 315/291 |
| 6,356,033 B1 | * | 3/2002 | Okamoto et al. | 315/209 R |
| 6,445,137 B1 | * | 9/2002 | Okamoto et al. | 315/246 |
| 6,495,972 B1 | * | 12/2002 | Okamoto et al. | 315/291 |
| 2004/0183455 A1 | | 9/2004 | Schallmoser | |
| 2004/0183461 A1 | | 9/2004 | Kane et al. | |
| 2004/0251851 A1 | * | 12/2004 | Maishima | 315/244 |
| 2005/0093478 A1 | | 5/2005 | Shiba | |
| 2007/0194721 A1 | * | 8/2007 | Vorperian et al. | 315/247 |

FOREIGN PATENT DOCUMENTS

| | | | |
|---|---|---|---|
| EP | 1093324 A1 | 4/2001 | |
| EP | 1280386 A2 | 1/2003 | |
| JP | 2002231478 A | 8/2002 | |
| WO | 03022015 A1 | 3/2003 | |
| WO | 03026361 A1 | 3/2003 | |

* cited by examiner

Primary Examiner — Douglas W Owens
Assistant Examiner — Tung X Le

(57) ABSTRACT

The present invention relates to an adaptive driver for driving a gas discharge lamp and a method for operating a gas discharge lamp driven by an adaptive driver, especially a capacitive gas discharge lamp and more especially a dielectric barrier discharge (DBD) lamp in a permanent optimized mode comprising the steps: measuring, sensing, and/or detecting a signal representing the key values of the output of the driver (current, power, voltage, frequency), calculating at least one actual reference value for the quality of the discharge of said lamp, comparing said actual reference value to at least one predefined value for an optimized operation mode of said lamp, and adjusting a power supply according to the result of said comparing.

18 Claims, 8 Drawing Sheets

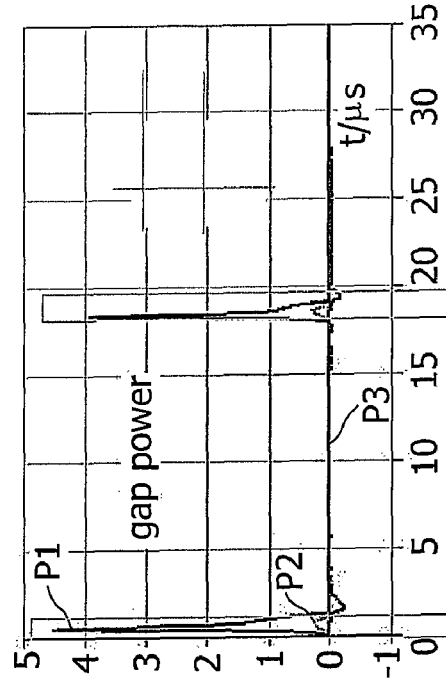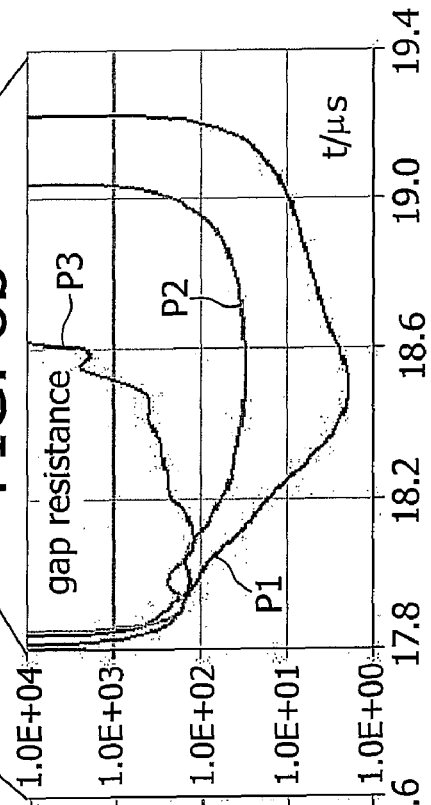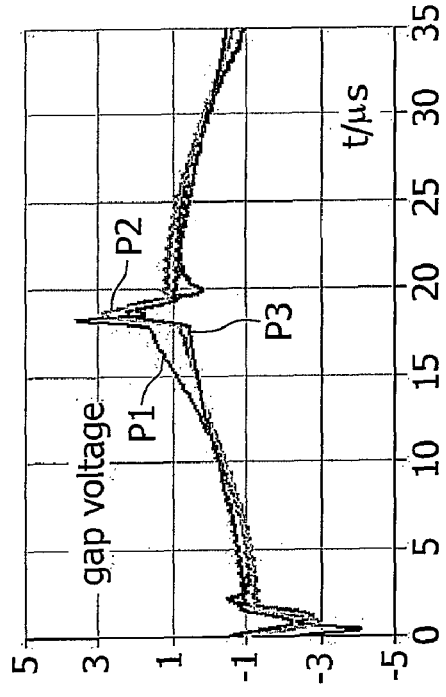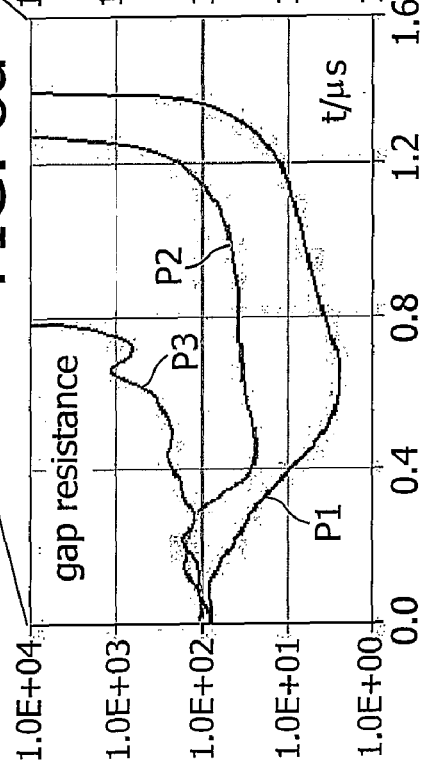

ADAPTIVE DRIVE FOR DIELECTRIC BARRIER DISCHARGE (DBD) LAMP

The present invention relates to an adaptive driver for a gas discharge lamp, especially for a capacitive gas discharge lamp and more especially for a dielectric barrier discharge (DBD) lamp for driving a connected lamp in a permanent optimized mode and a method therefore.

Gas discharge lamps, capacitive gas discharge lamps and especially DBD lamps are characterized by a capacitive coupling of electrical energy into the discharge volume, making use of at least one dielectric barrier between outer electrodes and the discharge. In particular, the invention refers to types of gas discharge lamps having a non-thermal (cold) plasma.

To achieve efficient coupling of energy over the dielectric barrier(s), the electrical energy is provided preferably in the form of electrical pulses of high voltage slope and a pulse repetition rate in the order of 10 kHz . . . 1 MHz. The plasma excited into the discharge volume generates an emission spectrum which is dependent on the type of gas filling, the pressure of the gas filling, the temperature of the gas filling, the geometry of the discharge volume (especially gap width), the driving scheme, and electrical input power. To achieve a maximum efficiency in terms of total optical output power versus electrical input power in discharge lamps with low or medium pressure gas fillings—with an internal absolute gas pressure below 1 bar—the discharge has to be of maximum homogeneity over the entire discharge volume of the lamp. The discharge is formed in form of filaments, which may take various shapes depending on the above mentioned parameters.

Drivers are generally used for driving lamps, especially DBD lamps to operate the lamp in a selected, optimized mode. Due to changes in at least one parameter influencing the operation of the lamp, the lamps operation can deflect from the optimized mode. To detect deflections from the optimized lamp operation mode several sensors have been proposed. Such sensors are for example photo detectors, thermal detectors, acoustic detectors, vibration detectors, ozone detectors and so on. These arrangements comprising detectors detect an abnormal discharge of a DBD lamp by means of indirect measurement.

A well known driver is disclosed in U.S. Pat. No. 6,495,972. U.S. Pat. No. 6,495,972 showing a dielectric barrier discharge lamp light source device having a discharge space filled with a discharge gas that emits light through a dielectric barrier discharge, said dielectric barrier discharge lamp light source device comprising: dielectric barrier discharge lamp having dielectrics interposed between at least one of a first electrode and a second electrode to induce a discharge phenomenon in said discharge gas; and; a power supply device for providing alternating current high voltage to said first electrode and said second electrode, said power supply device including an abnormal discharge detection circuit for detecting an abnormal discharge occurring within at least one of a transformer in said power supply device and a section of the power supply circuit from a secondary side output terminal of said transformer to said first electrode and said second electrode, wherein said power supply device is responsive to detection of said abnormal discharge by said abnormal discharge detection circuit for terminating the provision of alternating current high voltage to said electrodes, wherein said abnormal discharge detection circuit is operative for detecting only an abnormal discharge arising from electrical behaviour produced from said power supply device without detecting a special abnormal discharge due to a least one of photo, acoustic, thermal or chemical conditions.

This solution also detects an abnormal discharge, whereby the detection is done in this case by a direct measurement of electrical key values instead of indirect values as mentioned above.

This solution and the above mentioned solutions do have the drawback that only an abnormal discharge is qualitatively detected and the operation of the lamp is halted. A classification of a discharge type is not possible. Abnormal discharge in the sense of the prior art is any discharge outside the lamp, for example in the driver or outside the lamp due to cracks and the like. Thus it is not possible to quantify the deflection from an optimized operation mode that is the discharge type of a lamp and adjusting the supply of a lamp such, that an optimized operation mode is again adjusted.

Therefore it is an object of the present invention to provide an adaptive driver and a method for operating a discharge lamp reliably and/or permanently in an optimized operation mode, especially by detecting the discharge type. The operation mode is optimum if the discharge efficiency (DE) achieves the maximum possible for the given preset boundary conditions, like e.g. average electrical input power, or pulse repetition rate of the driver. The discharge efficiency is defined as optical output power of the lamp versus electrical input power to the lamp.

This issue is addressed by an adaptive driver for a gas discharge lamp, especially for a capacitive gas discharge lamp and more especially for a dielectric barrier discharge (DBD) lamp for adjusting the output signals/parameters of the driver via a cabling to a DBD lamp depending on the type/quality of a discharge of the DBD lamp, comprising: a closed control loop having a voltage supply unit, a detecting unit for detecting electrical output parameters of the driver, an adjustment unit, to which the detected electrical output parameters are passed and which tunes the voltage supply as a result of the detected feedback for adjustment of the output parameters, and cabling for coupling the units and for coupling the driver with a lamp.

For operation of a gas discharge lamp comprising capacitive gas discharge lamps and especially DBD lamps a driver is necessary. This driver comprises at least the power supply for supplying the lamp with energy and a sensing or detection unit for detecting abnormal behavior. Abnormal behavior in contrast to the abnormal discharge of the prior art comprises all kinds of abnormal discharge inside the lamp, whereby the abnormal discharge of said prior art comprises all abnormal discharge outside the lamp.

The driver comprises a closed control loop. The control loop is arranged as follows: first part of said loop is said supply unit. Said supply unit usually comprises a low voltage unit and a high voltage unit but can have any form of supply unit, suitable to supply a lamp, especially a DBD lamp. Arranged downstream to said supply unit is a detecting unit or sensing or measuring unit. This detecting unit detects or senses the output signals coming from the supply unit. The detecting unit derives the signal(s) on the one hand to a connected lamp being outside the drivers limits and on the other hand passes these signals to an adjusting unit. This adjusting unit calculates, whether the detected actual values derived from the detecting unit are acceptable or not. If the signal is detected as not acceptable, the adjusting unit sends signals to the supply unit for tuning or adjusting the power supply, so that in a next circulation the output signals of said supply unit are at least more closely to a wanted value at the output of said driver. This arrangement of supply unit, detecting unit, and adjusting unit represents the basic features of said closed control loop.

The detecting unit comprises well known means for detecting the basic electrical key values of the output of the driver that is at the cabling leading from the detecting unit to a connectable lamp. These electrical key values comprise the applied voltage, and/or the current flowing to the lamp.

This information is transferred from the detecting unit to the adjusting unit. The adjusting unit comprises means for adjusting or tuning the power supply or the supply unit that means for regulating the output of said supply unit. Further the adjusting unit comprises means for calculating a value derived from the input signals voltage and/or current. Therefore a special algorithm is implemented in the adjusting unit. Furthermore, the adjusting unit comprises means to store predefined reference values in a storage element, or an array or table of predefined values is used. Further the adjusting unit comprises means for comparing at least one calculated value to the predefined values and for tuning according to the result of this comparison the supply unit. Again the calculated values can be stored in a common storage element or in a separate storing element. The calculated value preferably is the discharge resistance (DR) which is explained later in detail when describing the corresponding method for operating a lamp in an optimized operation mode. As an alternative, the instantaneous discharge power (DP) can be determined to qualify the discharge.

Preferably the power supply comprises: an adjustable low voltage unit, being supplied by an energy source and a high voltage unit for supplying the lamp with high voltage.

The energy source is usually an external energy source and preferably is a supply source for AC mains power. This supply source serving as an input of energy for the supply unit is connected to the low voltage unit of said supply unit. Via transformation the low voltage in the low voltage unit is transformed to high voltage, suitable to supply a discharge lamp, in the high voltage unit. The voltage of the low voltage part preferably is in the range of $>=0$ V and $<=500$ V, more preferably in the range of $>=110$ V and $<=380$ V, and most preferably in the range of $>=200$ V and $<=260$ V, under consideration of the usual variability, especially in the AC-network.

More preferably the detecting unit includes means for measuring the lamp voltage, and/or the lamp current. This includes means for direct and/or indirect measurement of said electrical key values. Other electrical key values comprised by said means can be input voltage or current of the driver, current and/or voltage amplitude of the driver output, root-mean-square value of current and voltage output, voltage-time integral and/or current-time integral of voltage and current output, slope, or pulse repetition rate at the output of the driver.

The issue of the invention is further addressed by a method for operating a gas discharge lamp driven by an adaptive driver, especially a capacitive gas discharge lamp and more especially a dielectric barrier discharge (DBD) lamp in a permanent optimized mode comprising the steps: detecting at least one signal representing the key values of the output of the driver (current, power, voltage, frequency), calculating at least one actual value for the quality of the discharge of said lamp, comparing said actual value to at least one predefined reference value for an optimized operation mode of said lamp, and adjusting a power supply according to the result of said comparison.

The optimized mode is also the mode of best or maximum efficiency. As stated above, an indication for optimized mode is the form of single filaments or in common terms the discharge appearance or shape that is the homogeneity of said discharge. Usually there are four basic types of discharge shapes: a cone shaped discharge, a hot discharge (small rectangular or line), a rectangular (broad rectangular) discharge, and a partly hot discharge (hopper like). The filament shapes cone and—in bi-polar drivers—the filament rectangular generate a homogeneous discharge and thus are an indication for optimized operation mode of said lamp. In gas discharge lamps several types of filaments may occur at the same time, whereby the extreme situations are "ideal homogeneous" with only filaments of type cone and rectangular, respectively and "totally hot" with only hot filaments. As mentioned above, only the situation "ideal homogeneous" generates maximum of efficiency.

To achieve said maximum of efficiency the above mentioned steps are necessary. After connecting the driver to an external energy source, the supply unit generates an output signal. This signal is received in the detecting unit. The detecting unit measures the key values of said signal delivered from the supply unit (usually current and voltage). After measuring or detecting said signal, the information is sent to the adjusting unit. The adjusting unit stores that actual value or the actual information delivered from the detecting unit and calculates according to a predefined algorithm a corresponding value. The algorithm considers further given lamp properties like geometry of the lamp, parasitic impedance values of the lamp and/or the driver including cabling between lamp and driver, and the driver output impedance. As one result the discharge resistance DR is determined. In the adjusting unit several optimized DR values are stored for every or essential every situation of the lamp and/or driver, for example in arrays or matrices.

Another value that can be calculated to optimize the lamp efficiency by said adjusting unit is the instantaneous discharge power (DP).

Next the actual calculated value is compared to the stored and predefined DR and/or DP values. According to the corresponding situation the actual calculated reference value is compared to the corresponding stored value or values, e.g. if tolerances are also stored. If the actual value is above the optimized stored value, the adjusting unit generates a signal which is transmitted to the supply unit and which tunes the supply unit in way, the actual value of next circulation is closer to the optimized stored or predefined value. If the actual value is below the optimized stored or predefined value, the adjusting unit accordingly generates a signal which is transmitted to the supply unit and which tunes the supply unit in way, the actual value of next circulation is closer to the optimized stored or predefined value. If the actual reference value is conforming to the predefined value, no signal for tuning the supply unit is generated.

Preferably the step measuring the signal representing the key values comprises at least one of the steps: measuring the current of the output of said driver, and/or measuring the voltage of the output of said driver. These values are the key values and can be directly measured. If an indirect measurement is applied, further properties or values of the output signal can be gained or obtained.

More preferably the calculation comprises at least one of the steps: determining the DR, determining the DP, and/or determining a combination of DR and DP. DR and DP depend among other on the average electrical input power value, which is shown in greater detail in the description of figures. Although one of the values, DR or DP, deflects from the optimized value, still the efficiency can be improved by optimizing the other value, DR and DP respectively. If both values DR and DP are optimized, a maximum of efficiency is reached. So a combined value of DR and DP can be calculated to start a comparison to only one value instead of DR and DP.

The calculation of DR and DP is based on the determination of the voltage applied to and the current flowing through the discharge of the lamp. By solving the equations for the electrical representation of the lamp, lamp housing, and electrical connections to the lamp, the lamp-internal discharge voltage and discharge current can be determined for every moment of time. The underlying equivalent circuit used for this purpose is described below.

Moreover it is preferably that the comparison comprises at least one of the steps: comparing whether the actual value is>the predefined value, comparing whether the actual value is=the predefined value, and/or comparing whether the actual value is<the predefined value. According to these three possible situations different steps depending on this comparison can be started. If the actual calculated value is above a predefined value, a signal for tuning the supply unit in a direction, that the actual value comes closer to the predefined and optimized value is generated. If the actual calculated value is below a predefined corresponding value, again a signal for tuning the supply unit in a direction, that the actual value comes closer to the predefined and optimized value is generated. If the actual value is conforming to the predefined optimized and predefined value, no signal generating is necessary. Of course the predefined value can be a range of values, whereby the comparison is done with regard to the width of the range.

In addition it is preferably that the comparison comprises the step: comparing whether the actual value is in a tolerance range of said predefined value. Besides the values for an optimized operation mode for different situation the stored value(s), the array or matrices of values can further comprise tolerance values, which represent a near optimized range in which no essential losses of efficiency are detectable.

Preferably at least one of the steps is done continuously. That means for example the measuring of the actual value can be done continuously. So not only one value can be measured but rather a time correlated stream of values. This would give a raise in accuracy.

Also preferably is, that at least one step is done discontinuously. For example the measuring of the actual value can be done in discrete steps. This would lower the accuracy compared to a continuously measurement but would need less storage and/or computational capacity.

These and other aspects of the invention will be apparent from and elucidated with reference to the embodiments described herein after.

FIG. 7a shows the lamp voltage versus time applied to a double sided DBD lamp (bi-polar voltage) over one period.

FIG. 7b shows the instant electrical power versus time dissipated into the discharge over one period.

FIG. 8a shows the discharge resistance versus time of the lamp during first power release FIG. 8b shows the discharge resistance versus time of the lamp during second power release

Figure 1:
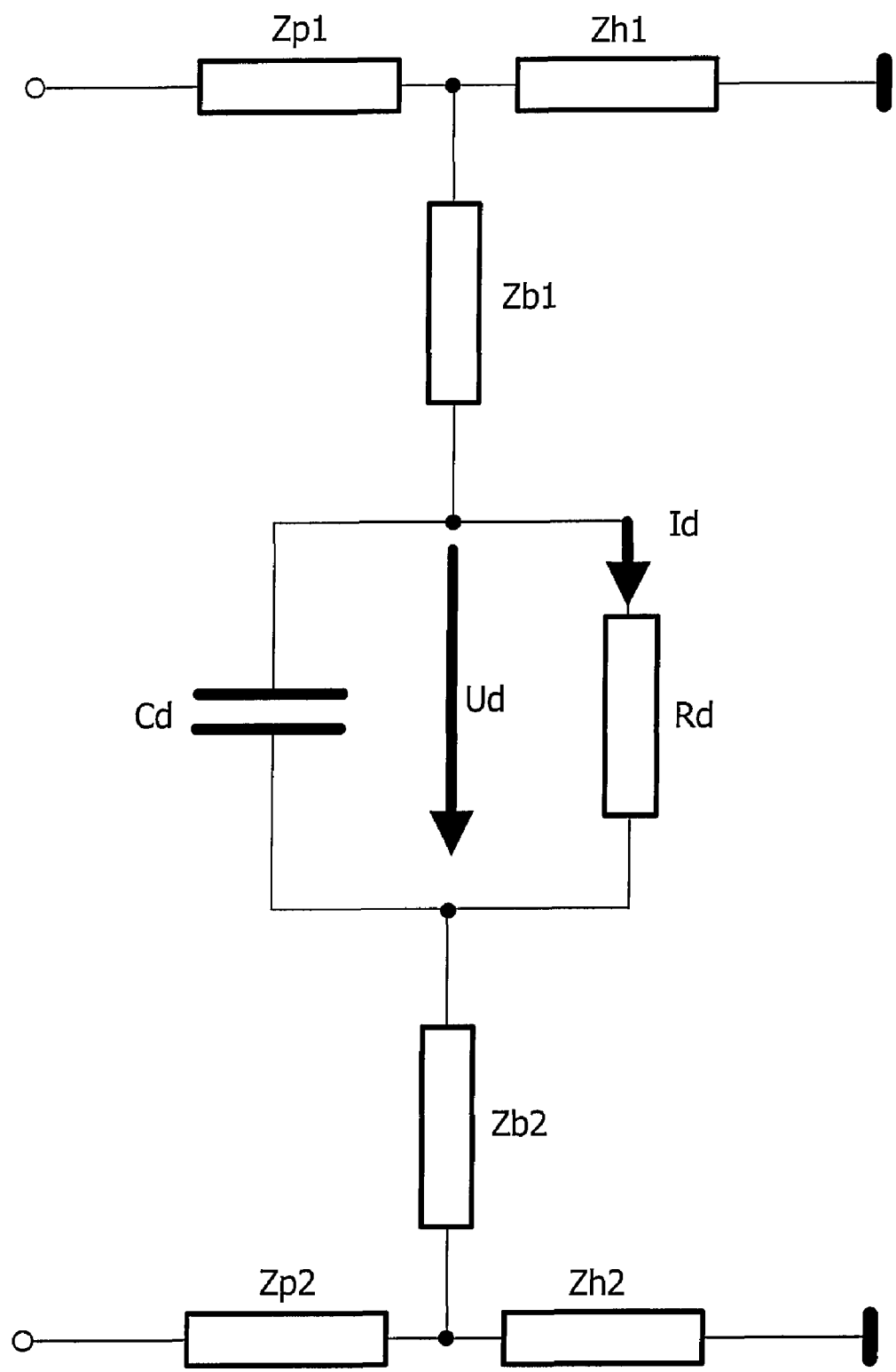
FIG. 1 shows an equivalent circuit for the lamp including parasitic elements for electrical connections and housing

In FIG. 1 represents an equivalent circuit used to describe the electrical surrounding of the lamp. It consists of the known parasitic impedance values of the electrical connection between lamp and driver Zp1 and Zp2, the known parasitic impedance of the lamp housing Zh1 and Zh2, the known capacitance of the dielectric barriers Zb1 and Zb2, and the known capacitance of the discharge volume Cd. With all these parameters given, the time-dependent discharge resistance DR and/or the time dependent (instantaneous) discharge power DP can be calculated. If Ud is the time dependent and calculated voltage across the discharge, and Id is the time dependent and calculated current across the discharge, the relation holds $$DR=Ud/Id \quad DP=Ud*Id$$

The calculation of Ud and Id is based on the solution of the equivalent circuit, representing the electrical behavior of the lamp, the lamp housing, and the electrical connection between lamp and driver.

The arrows represent the current flowing in positive direction.

Figure 2A:
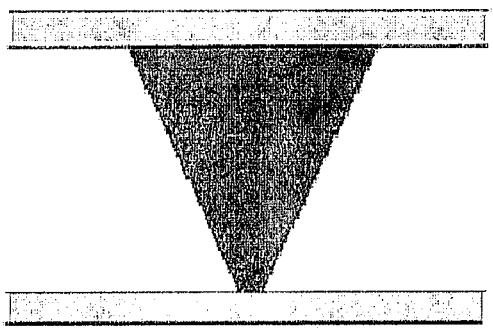
FIG. 2a to 2d shows schematically different types of discharge.

In FIG. 2a-2d typical shapes of filaments of a gas discharge are shown. The filaments are visible to the human eye. FIG. 2a shows a cone shaped discharge which represents a diffuse filament type that generates a homogeneous discharge. The cone shaped discharge is a fundamental type. The discharge or rather the plasma channel shown in FIG. 2a is precondition for a maximum of efficiency. The cone shaped filament evolves when the discharge is driven by a uni-polar type of voltage, as shown e.g. in FIG. 3a.

Figure 2B:
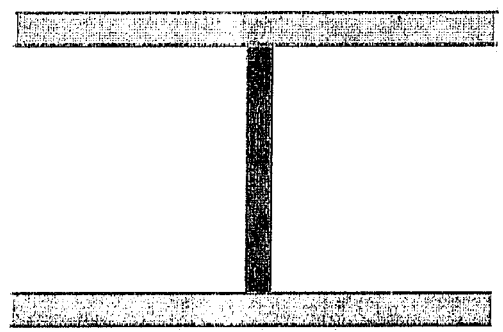

FIG. 2b shows another fundamental type of discharge, namely a so called hot discharge. Here the discharge current is confined to a narrow plasma channel, resulting into local heating of the filament. This heating effect generates hot electrons, ions and excited gas atoms or molecules. The efficiency drops significantly compared to that shape of FIG. 2a.

Figure 2C:
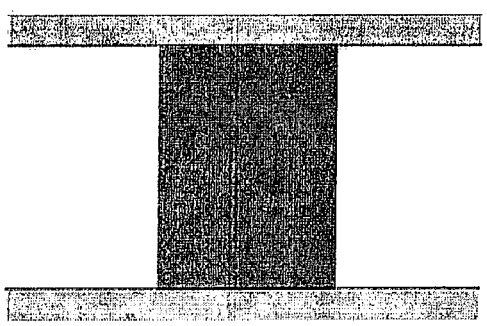

FIG. 2c shows a rectangular shape of discharge, representing a diffuse filament type. This filament evolves when the discharge is driven by a bi-polar voltage type, as shown e.g. in FIG. 5a. The rectangular shape generates a homogeneous discharge. The rectangular shape can be interpreted as resulting from overlap of two filaments according to FIG. 1a having opposite directions, found in bi-polar driving schemes with symmetrical positive and negative going pulses.

Figure 2D:
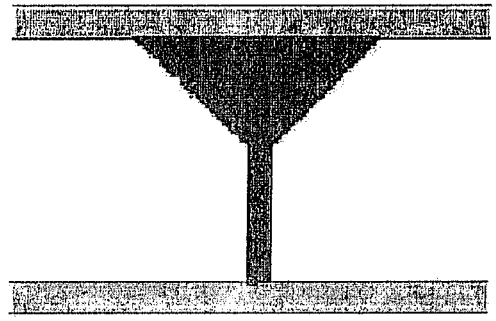

FIG. 2d shows a partly hot discharge, whereby only a part of the discharge current is confined to a narrow plasma channel, resulting into local heating of the filament. The heating effect of this shape is partly the same as described in FIG. 2b.

Several types of filaments may occur in a gas discharge lamp especially in a DBD lamp at the same time. The extreme situations are characterized as "ideal homogeneous" if only diffusive filaments of type a or c are present, and "totally hot" if only hot filaments are generated. The ideal homogeneous discharge generates optimum efficiency.

FIG. 3a to 8b show the DR and DP, respectively, for various driving schemes on a double sided DBD lamp.

Figure 3A:
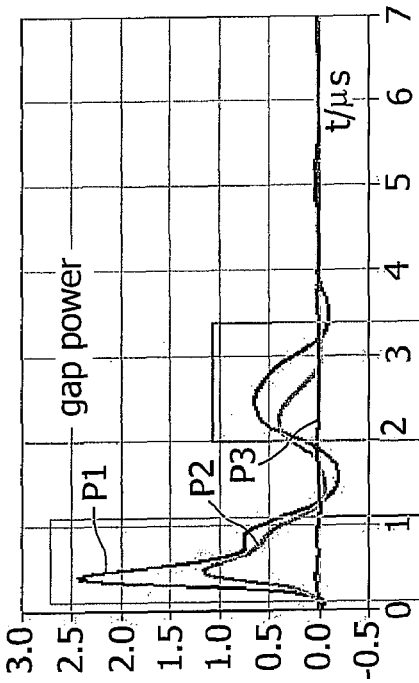
FIG. 3a shows a diagram of the lamp voltage versus time applied to a doubled sided DBD lamp over one period.

FIG. 3a shows the voltage applied to a double sided DBD lamp. The applied voltage is of uni-polar type. Shown is the course over one time period.

Figure 3B:
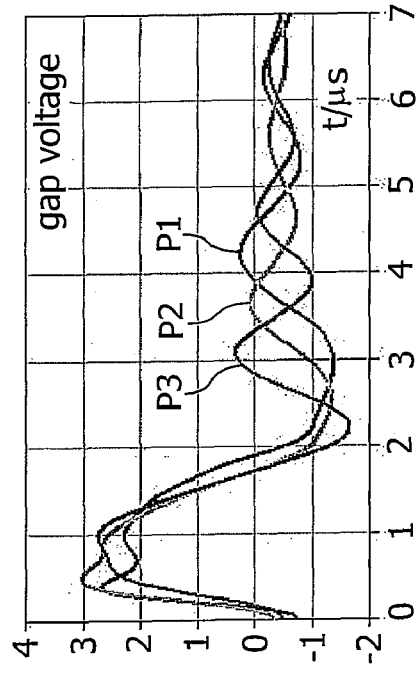
FIG. 3b shows a diagram of the instant electrical power versus time of a doubled sided DBD lamp over one period.

FIG. 3b shows the corresponding instant electrical power dissipated into the discharge of a double sided DBD lamp. The applied voltage again is of uni-polar type. Shown is the course over one time period.

The graphs in FIG. 3a and FIG. 3b show voltage and power, respectively, of the discharge inside a DBD lamp with three different values of mean electrical input power P1 to P3, whereby P1>P2>P3. The driver is in both cases of a uni-polar type. The driving mode P1 and P2 are homogeneous having diffuse filaments only (ideal homogeneous).

Figure 4B:
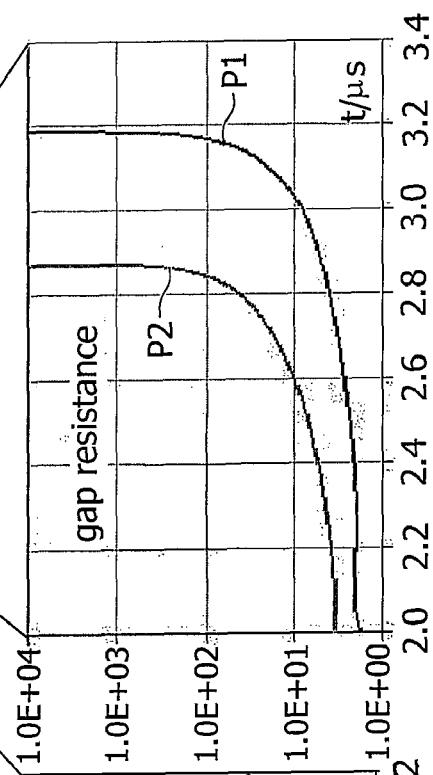
FIG. 4b shows a diagram of the discharge resistance versus time of a second discharge at the moment of second power release.
Figure 4A:
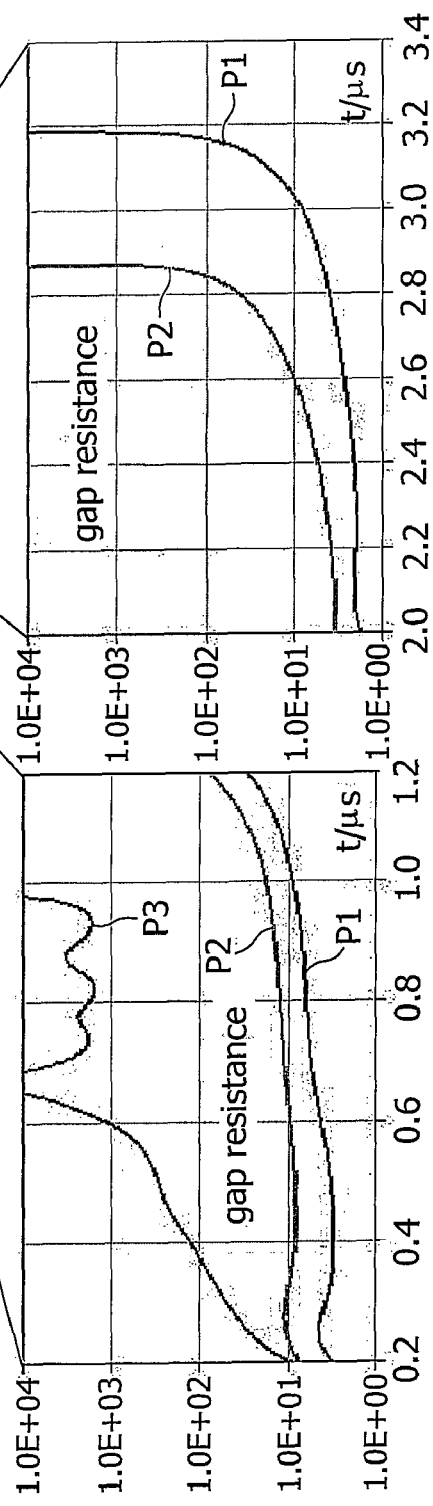
FIG. 4a shows a diagram of the discharge resistance versus time of a first discharge at the moment of first power release.

FIG. 4a and FIG. 4b show the resistance of the discharge in FIGS. 3a/3b, with zoom of the time axis to the moment of power release. In FIG. 4a the first discharge at the moment of first power release is shown. FIG. 4b shows the second discharge at the moment of second power release. Both figures (FIG. 4a and FIG. 4b) show clearly, that the DR values—the discharge resistance during power release—are obviously dependent on the mean power value. In FIG. 4b, the discharge resistance related to the line P3 is out of scale (higher than the maximum value on the ordinate). Therefore, only two lines, corresponding to P1 and P2, are visible.

Figure 5A:
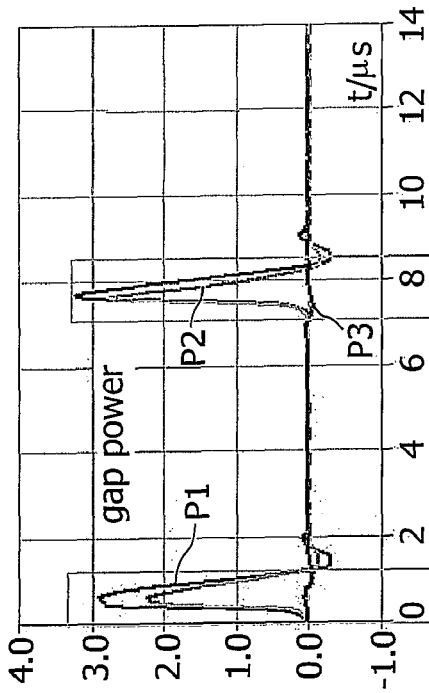
FIG. 5a shows a lamp voltage versus time applied to a double sided DBD lamp (bi-polar voltage) over one period
Figure 5B:
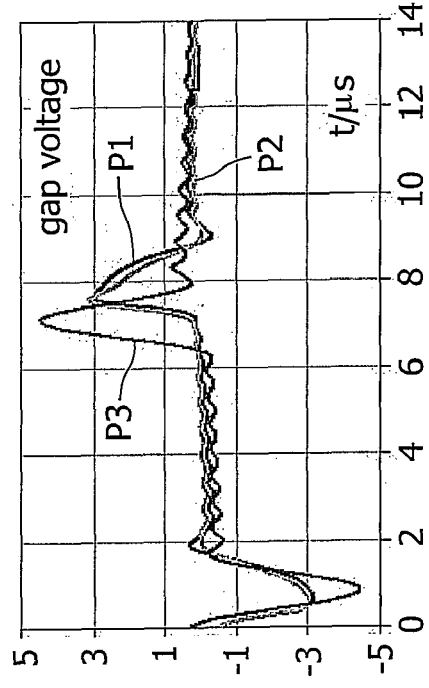
FIG. 5b shows the instant electrical power versus time dissipated into the discharge of a double sided DBD lamp over one period.

In the next two figures FIG. 5a and FIG. 5b the lamp used for the FIG. 3a-4b is driven with a bi-polar driver at the same pulse repetition frequency.

FIG. 5a shows the voltage applied to a double sided DBD lamp. As mentioned above, the voltage is of a bi-polar type.

FIG. 5b shows the instant electrical power dissipated into the discharge of a double sided DBD lamp. Again the voltage is of a bi-polar type.

Both graphs—the graph in FIG. 4a and the graph in FIG. 5b—show voltage and power, respectively inside a DBD lamp with three different values of mean electrical power P1, P2, P3 with P1>P2>P3. The driver is of a bi-polar type. The driving modes P1 and P2 are homogenous, with diffuse filaments only, that is ideal homogeneous.

Figure 6A:
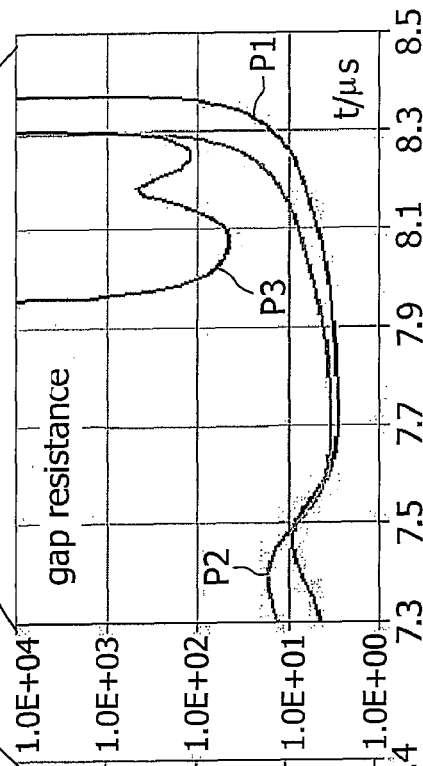
FIG. 6a shows the discharge resistance of the discharge according to FIGS. 5a and 5b at the moment of first power release.

FIG. 6a shows the resistance of the discharge in FIG. 5a, with zoom of the time axis to the moment of first power release.

Figure 6B:
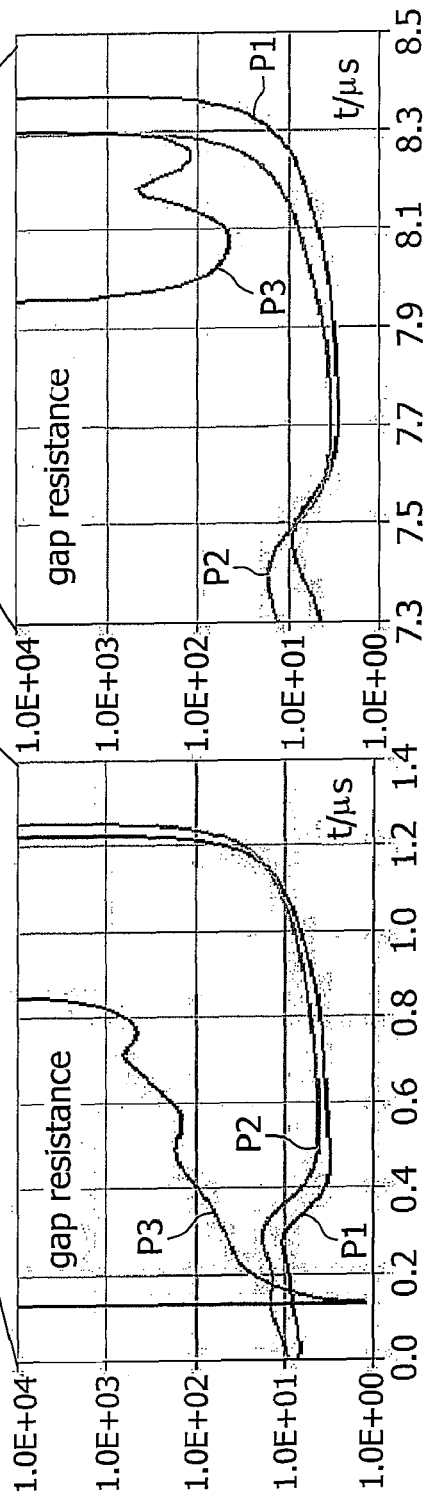
FIG. 6b shows the discharge resistance of the discharge according to FIGS. 5a and 5b at the moment of second power release.

FIG. 6b shows the resistance of the discharge according to FIG. 5a, again with zoom of the time axis to the moment of second power release.

In FIG. 6a and FIG. 6b the DR value is obviously dependent on the mean power value In FIGS. 7a and 7b the same lamp as before is used, whereby the lamp is driven by a bi-polar driver at lower pulse repetition frequency. As a consequence, hot filaments are generated.

FIG. 7a shows the voltage applied to a double sided DBD lamp, whereby the voltage is of a bi-polar type and the pulse repetition frequency is lower than before.

FIG. 7b shows the corresponding instant electrical power dissipated into the discharge of a double sided DBD lamp.

Both graphs of FIG. 7a and FIG. 7b, respectively, show voltage and power, respectively of the discharge inside a DBD lamp with three different values of mean electrical imputer power. The driver is of a bi-polar type. There are three driving modes with different power P1, P2, P3; P1>P2>P3, whereby the driving modes P1 and P2 are inhomogeneous, with hot filaments only (totally inhomogeneous).

FIG. 8a shows the resistance of the discharge according to FIGS. 7a/7b, with zoom on the time axis to the moment of first power release and FIG. 8b shows the resistance of the discharge according to FIGS. 7a/7b, with zoom on the time axis to the moment of second power release.

In contrast to the homogeneous discharges with diffusive filaments only, FIGS. 9a and 9b show that the DR takes higher initial values at the begin of power release compared to the values shown in FIGS. 4a/4b and 6a/6b. The instant power versus time of the filamented discharges in FIG. 7b shows a totally different appearance compared to FIGS. 3b and 5b, with high but narrow intervals of power dissipation.

Thus it is obvious that a distinction can be made by electrical means to detect the degree of filamentation of a discharge in a DBD lamp.

Figure 10A:
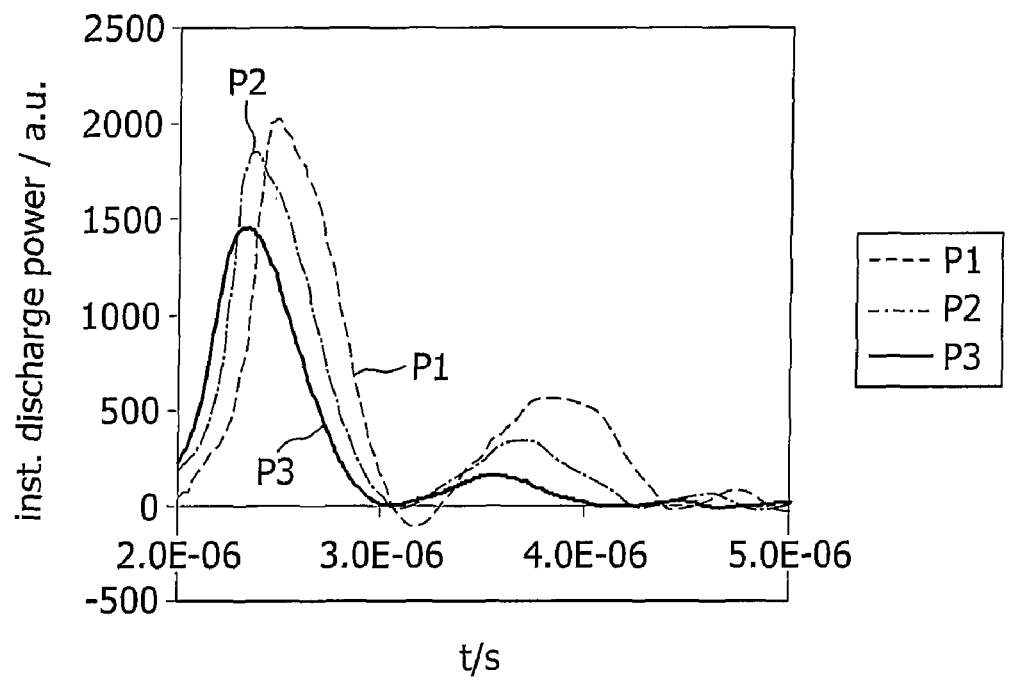
FIG. 10a to 10b show the discharge power and discharge resistance versus time
Figure 10B:
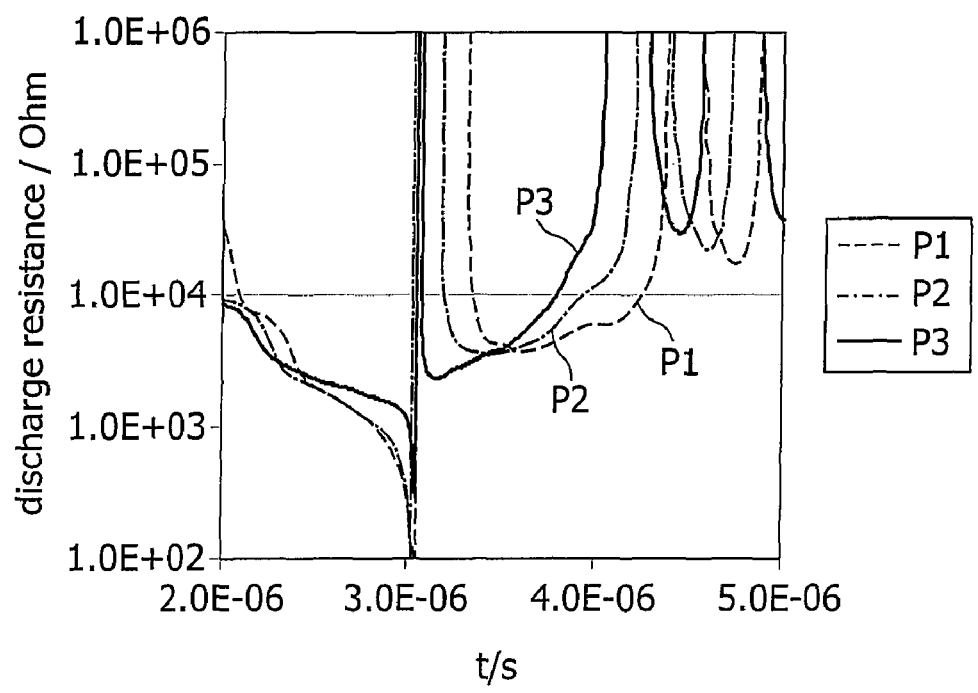

The FIGS. 10a and 10b show instant DP and DR of a double sided DBD lamp with three different levels of average input power P1>P2>P3. Also the corresponding discharge efficiencies DE are different, with DE1<DE2<DE3. The graphs show that there is a distinct relation between DP and DE. Pulse repetition rate of the driving voltage is identical for all trace P1, P2 and P3.

Figure 11A:
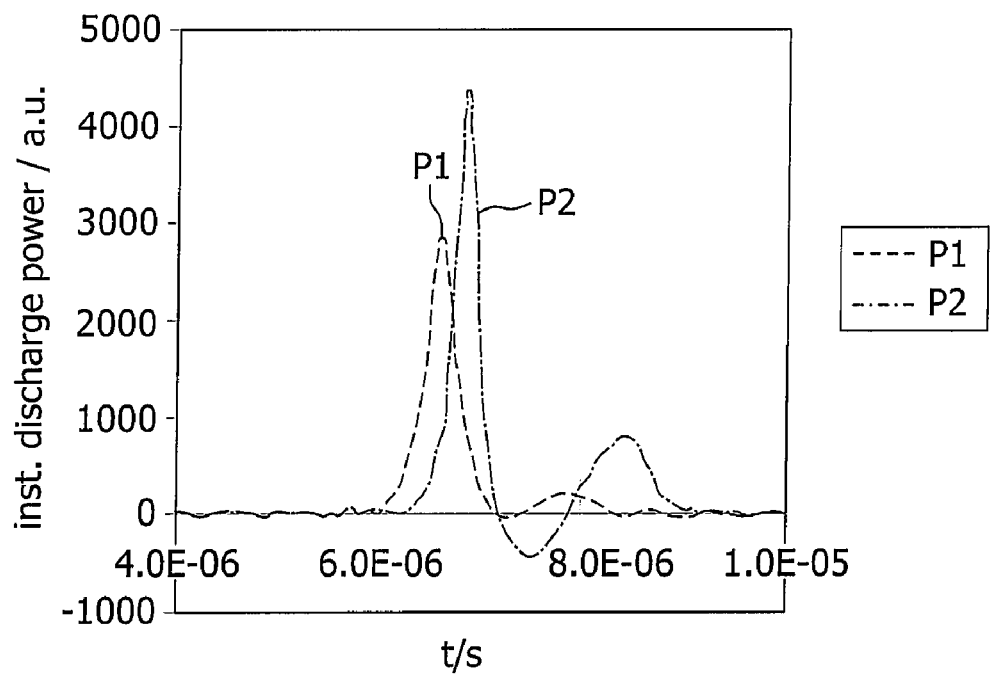
FIG. 11a to 11b show the discharge power and discharge resistance versus time
Figure 11B:
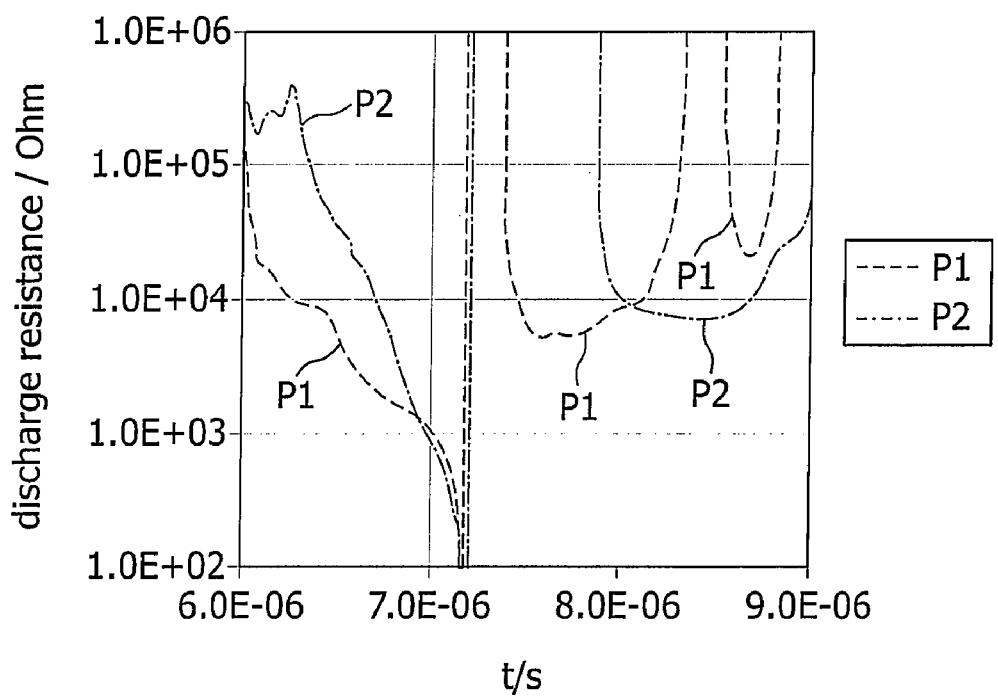

The FIGS. 11a and 11b show DP and DR of a double sided DBD lamp at two equal levels of average input power P1=P2. The discharge efficiencies however are different, with DE1>DE2.

From these graphs it is obvious that there is a distinct relation between average input power, instant discharge power, instant discharge resistance, and discharge efficiency. The discharge efficiency can be optimized for every level of the average input power if the relation between DR and/or instant DP and efficiency is known. Thus, the lamp efficiency can be optimized by means of the invention.

The examples of FIG. 2a to FIG. 11b show that it is possible to qualify the discharge of a DBD lamp and thus a gas discharge lamp by measuring and/or determining the DR and DP value. This information can be used to adjust the parameters of the DBD lamp driver, for example output voltage or current amplitude, slope, pulse repetition frequency, and/or pulse width, to achieve optimum efficiency of the lamp.

Figure 9:
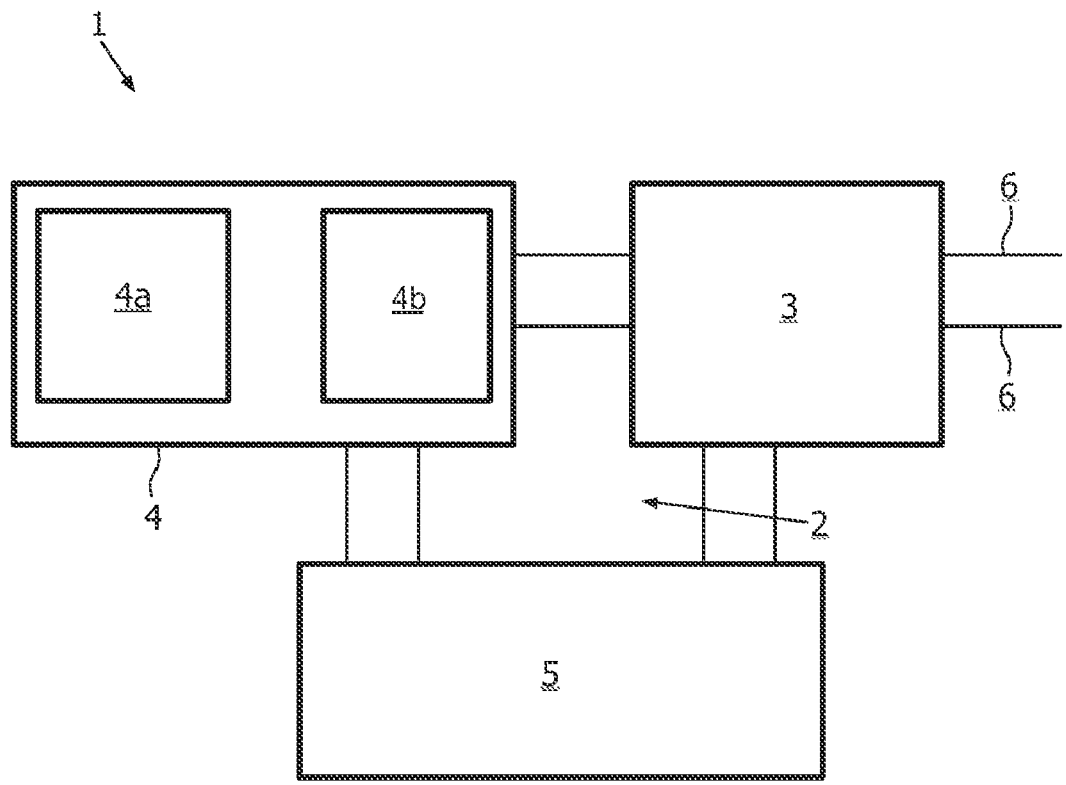
FIG. 9 shows schematically the design of an adaptive driver.

FIG. 9 shows a schematic arrangement of an adaptive driver 1. The driver 1 comprises a closed control loop 2, including a detecting unit 3 with means for measuring signals for calculating the DR and DP, a supply unit 4 for supplying lamp and/or driver with energy, and an adjusting unit 5 with means for adjusting the output driver parameters.

For the measurement of signals for calculating the DR and DP, analog, digital, or mixed signal data acquisition are feasible. The sensing or detecting unit 3 or circuit provides information on the voltage and current applied to the lamp. The units are coupled via leads, whereby the sensing or detecting units can be coupled to a discharge lamp via output leads 6 leading from the driver 1 to the lamp.

In the adjustment unit 5, the time resolved lamp voltage and current—or estimates on these values, based on indirect measurements (e.g. average lamp power in combination with root-mean-square voltage value and pulse repetition rate)—are used to calculate the DR and DP. This calculation can be performed either by analog computing, or by digital or mixed analog/digital signal processing. The DR at the moment of power release, and/or the DP at the moment of power release, is/are compared to pre-defined values. If this comparison shows that the lamp is driven in a mode with hot filaments, the adjustment unit 5 modifies the driver output signals by changes in the low-voltage section 4a of the adaptive driver 1.

Possible parameters to adjust are: Switching frequency, loading and unloading time, primary voltage and current amplitude, and others. These modifications are passed by the high voltage section 4b of the circuit 2 to the output lines or leads 6 of the driver 1.

As a variant, the detecting unit 3 can be located within the low voltage or primary unit 4a, if reliable estimates on the discharge resistance can be derived from these signals.

A second variant according to the invention is to change the pre-defined DR and/or DP values. These changes may either be made off-line, e.g. using programming means on a digital driver interface, or by adjustment of analog signals taken as reference for optimum DR/DP values. Or these changes are made on-line, while the driver 1 is running and the DBD lamp burning. In this case, the reference DR/DP value may be derived from the actual optical output requirements of the lamp, to guarantee an optimum efficiency of the lamp at any working point in terms of optical output.

Another variant is to save not only single reference values of the DR/DP, but a complete table, or a given relation (functional dependence) of DR/DP versus electrical and/or optical lamp power values.

Another variant of the invention is to add safety precautions to the functionality of the driver. Having sensing means available for output voltage and current, the failure modes "overvoltage/undervoltage", "overcurrent/undercurrent", and "overpower/underpower" can be determined. If deviations from the setpoint, including tolerance limits, are detected, the lamp driver 1 can shut down to avoid damage to equipment or personnel.

Another variant of the invention is to optimize the dimming mode of the lamp driver. Dimming is either possible by burst mode driving, frequency or amplitude modulation, or combinations of these measures. All of these methods are facing the risk of loosing the optimum driving point in terms of lamp efficiency. The invention can be used to implement the required changes in driver output voltage and/or current, to achieve the best possible efficiency in dimmed driving modes of the lamp.

The invention enables to achieve an optimum lamp efficiency of gas discharge lamps in all possible driving modes. Safety measures are easy to implement, and dimming mode can be controlled to avoid hot filamentation and thus loss of efficiency.

The invention claimed is:

1. An adaptive driver for driving a capacitive gas discharge lamp electrically coupled to the adaptive driver, the adaptive driver comprising:
    a power supply unit;
    a detecting unit for detecting electrical output parameters of the adaptive driver; and
    an adjustment unit configured to calculate at least one of discharge resistance and instantaneous discharge power using the detected electrical output parameters from the detecting unit and to tune the power supply based on the calculated at least one of the discharge resistance and the instantaneous discharge power for adjustment of the electrical output parameters.

2. The adaptive driver according to claim 1, wherein the power supply comprises:
    an adjustable low voltage unit, being supplied by an energy source, and a high voltage unit for supplying the lamp with high voltage.

3. The adaptive driver according to claim 1, wherein the detecting unit measures at least one of a lamp voltage and a lamp current.

4. The adaptive driver according to claim 3, wherein the adjustment unit calculates the at least one of the discharge resistance and the instantaneous discharge power using the measured at least one of the lamp voltage and the lamp current supplied by the adjustable driver to the lamp.

5. A system incorporating a gas discharge lamp and the adaptive driver for driving the lamp according to claim 1, and being used in one or more of the following applications:
    fluid or surface treatment of surfaces, for cleaning,
    disinfection,
    purification,
    liquid disinfection or purification,
    food treatment or disinfection,
    beverage treatment or disinfection,
    water treatment or disinfection,
    wastewater treatment or disinfection,
    drinking water treatment or disinfection,
    tap water treatment or disinfection,
    production of ultra pure water,
    reduction of the total organic carbon content of a liquid or a gas,
    gas treatment or disinfection,
    air treatment or disinfection,
    exhaust gases treatment or cleaning,
    cracking or removing of components, including anorganic or organic compounds,
    cleaning of semiconductor surfaces,
    cracking and/or removing of components from semiconductor surfaces,
    cleaning and/or disinfection of food supplements,
    cleaning and/or disinfection of pharmaceuticals.

6. The adaptive driver according to claim 1, wherein the gas discharge lamp comprises a dielectric barrier discharge (DBD) lamp.

7. The adaptive driver according to claim 1, wherein the detecting unit measures average lamp power supplied by the adjustable driver to the lamp, in combination with a root-mean-square voltage value and a pulse repetition rate, and
    wherein the adjustment unit calculates the at least one of the discharge resistance and the instantaneous discharge power by estimating at least one of a lamp voltage and a lamp current supplied by the adjustable driver to the lamp based on the average lamp power, the root-mean-square voltage value and the pulse repetition rate, and calculates the at least one of the discharge resistance and the instantaneous discharge power based on the estimated at least one of the lamp voltage and the lamp current.

8. A method for operating a gas discharge lamp driven by an adaptive driver in a permanent optimized mode, the method comprising:
    measuring a signal representing at least one value of an output of the driver;
    calculating at least one actual value for the quality of the discharge of the lamp;
    comparing the at least one actual value to at least one predefined value for an optimized operation mode of the lamp; and
    adjusting a power supply according to the result of the comparing, wherein the at least one actual value comprises at least one of a discharge resistance value and an instantaneous discharge power value.

9. The method according to claim 8, wherein measuring the signal representing the at least one value comprises:
    measuring a current of the output of the driver; and
    measuring a voltage of the output of the driver.

10. The method according to claim 8, comparing comprises:
  comparing whether the at least one actual value is greater than the at least one predefined value,
  comparing whether the at least one actual value is equal to the at least one predefined value, or
  comparing whether the at least one actual value is less than the at least one predefined value.

11. The method according to claim 8, wherein comparing comprises the step:
  comparing whether the actual value is in a tolerance range of the predefined value.

12. The method according to claim 8, wherein at least one step is done continuously.

13. The method according to claim 8, wherein at least one step is done discontinuously.

14. An adaptive driver for driving a capacitive gas discharge lamp electrically coupled to the adaptive driver, the adaptive driver comprising:
  a power supply unit;
  a detecting unit for detecting electrical output parameters of the adaptive driver; and
  an adjustment unit configured to calculate discharge resistance using the detected electrical output parameters from the detecting unit and to tune the power supply based on the calculated discharge resistance for adjustment of the electrical output parameters.

15. The adaptive driver according to claim 14, wherein the power supply comprises:
  an adjustable low voltage unit, being supplied by an energy source, and a high voltage unit for supplying the lamp with high voltage.

16. The adaptive driver according to claim 14, wherein the detecting unit measures at least one of a lamp voltage and a lamp current, and
  wherein the adjustment unit calculates the discharge resistance using the measured at least one of the lamp voltage and the lamp current supplied by the adjustable driver to the lamp.

17. The adjustable driver according to claim 14, wherein the detecting unit measures average lamp power supplied by the adjustable driver to the lamp, in combination with a root-mean-square voltage value and a pulse repetition rate, and
  wherein the adjustment unit calculates the discharge resistance by estimating at least one of a lamp voltage and a lamp current supplied by the adjustable driver to the lamp based on the average lamp power, the root-mean-square voltage value and the pulse repetition rate, and calculates the discharge resistance based on the estimated at least one of the lamp voltage and the lamp current.

18. The adaptive driver according to claim 14, wherein the adjustment unit is further configured to calculate discharge power using the detected electrical output parameters from the detecting unit and to tune the power supply based on the calculated discharge power and the calculated discharge resistance for adjustment of the electrical output parameters.

* * * * *